Patented Dec. 13, 1938

2,140,461

UNITED STATES PATENT OFFICE 2,140,461

CYCLOHEXYLAMMONIUM MANDELATE

Elmer H. Stuart, Indianapolis, Ind., assignor to Eli Lilly and Company, Indianapolis, Ind., a corporation of Indiana No Drawing. Application June 22, 1938, Serial No. 215,231

1 Claim. (Cl. 260—501)

It is the object of my invention to produce the new compound cyclohexylammonium mandelate; which I have found to be a therapeutically effective urinary antiseptic.

It is known that the sodium and ammonium salts of mandelic acid are effective in the treatment of urinary infections.

However, both sodium mandelate and ammonium mandelate, as prepared by the usual methods, are objectionable from certain standpoints; and my invention makes available a mandelate salt which does not have those objections. Sodium mandelate is objectionable because the presence of the sodium increases the fixed alkali in the body, which makes it more difficult to acidify the urine sufficiently to make the mandelic acid effective as a urinary antiseptic; so that when sodium mandelate is given as a urinary antiseptic, it is necessary that relatively large quantities of some acidifying agent be also administered, which involves unduly large dosages and sometimes causes undesirable side effects. Ammonium mandelate is objectionable because, as ordinarily prepared, it is hygroscopic, and hard to obtain in a dry form. Both sodium mandelate and ammonium mandelate also have a pronounced objectionable taste which is hard to mask, so that it is almost impossible to prepare a pleasant-tasting elixir from them.

Thus neither sodium mandelate nor the ordinary ammonium mandelate is available to produce a dry, non-hygroscopic powder which does not oppose acidification of the urine and which can be administered in a form which will pass through the stomach into the intestines, as by being enteric coated; or to produce a pleasant-tasting elixir.

I have found that cyclohexylammonium mandelate is advantageous as a urinary antiseptic, and in addition is free from the objections noted above for sodium mandelate and ammonium mandelate.

In addition, it is a mandelate whose taste can be rather readily masked in the form of an elixir.

The cyclohexylammonium mandelate may be prepared by producing a reaction between cyclohexylamine and mandelic acid, desirably in the presence of a solvent, such as alcohol or water. This may be done by dissolving molecular quantities of the desired reactants in suitable solvents which are miscible with each other, and mixing the two solutions together. For example, the cylclohexylamine may be dissolved in 95% ethyl alcohol, and the mandelic acid in ether. However, the method which I prefer is to dissolve the cyclohexylamine and mandelic acid separately in 95% ethyl alcohol, and then to mix the two solutions together, desirably and conveniently at ordinary room temperature. The cyclohexylamine salt of mandelic acid (cyclohexylammonium mandelate) crystallizes out of the alcoholic solution almost immediately. The crystals may be suitably separated from the mother liquor, as by filtering or centrifuging; washed if desired by additional small amounts of 95% ethyl alcohol to remove the last of the mother liquor; and either air-dried or vacuum-dried if a dry solid is desired.

As example of preparing the new salt of cyclohexylammonium mandelate is: Fifty grams of mandelic acid are dissolved in 200 cc. of 95% ethyl alcohol. Thirty-five cc. of cyclohexylamine are dissolved in 65 cc. of 95% ethyl alcohol. The two solutions are mixed together rapidly. The cyclohexylammonium mandelate separates out of solution almost immediately. The mixture develops heat to some extent, on account of the chemical reaction; and so is desirably cooled to room temperature, and then filtered. The crystals are washed on the filter with a small amount of alcohol, and then air-dried at 130° F. The amount of the cyclohexylammonium mandelate obtained is about 77 grams.

Cyclohexylammonium mandelate is a non-hygroscopic, white, crystalline powder, which melts at about 208° C. corrected. It is soluble in water, slightly soluble in alcohol and insoluble in ether. It is stable under ordinary conditions.

Cyclohexylammonium mandelate on oral administration is effective in the treatment of urinary infections. It may be administered as an elixir, in dilute alcohol. It is preferably administered, however, in enteric-coated tablets; for because the salt is non-hygroscopic it lends itself readily to being formed into such tablets. On oral administration, such enteric-coated tablets pass substantially without change through the stomach into the intestines, where the tablets disintegrate and thus make available there the cyclohexylammonium mandelate for absorption; which avoids any gastric disturbance.

If the urinary infection is of *B. coli*, the cyclohexylammonium mandelate in itself is usually sufficient to produce adequate acidification of the urine to enable the mandelic acid to be effective in combating the infection; in which case ordinarily no additional acidifying agent is required for simultaneous administration. However, if the infection is of *B. proteus*, such infection causes fermentation of the urine in the bladder, and a resultant production of such high alkalinity in such urine that the mandelate is unable to act effectively against the infection. Therefore, when the infection is of *B. proteus*, it is desirable to administer with the mandelate a suitable amount of an acidifying agent, such as ammonium chloride or ammonium nitrate, but relatively small amounts of it are needed in comparison to the amount which is needed when sodium mandelate is administered. The cyclohexylammonium mandelate and the desired amount of ammonium chloride may be put into the same enteric-coated tablet, so that the ammonium chloride as well as the mandelic acid passes through the stomach without absorption.

While the proportion of ammonium chloride to the cyclohexylammonium mandelate may be varied to suit conditions, I find it advantageous to use about one gram of the acidifying agent to about two to four grams of the cyclohexylammonium mandelate, to produce a uniform mixture which is put up in enteric-coated tablets.

I claim as my invention:

Cyclohexylammonium mandelate.

ELMER H. STUART.